US011334763B2

(12) United States Patent
Wei et al.

(10) Patent No.: US 11,334,763 B2
(45) Date of Patent: May 17, 2022

(54) IMAGE PROCESSING METHODS, TRAINING METHODS, APPARATUSES, DEVICES, MEDIA, AND PROGRAMS

(71) Applicant: BEIJING SENSETIME TECHNOLOGY DEVELOPMENT CO., LTD., Beijing (CN)

(72) Inventors: Yi Wei, Beijing (CN); Hongwei Qin, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 143 days.

(21) Appl. No.: 16/700,348

(22) Filed: Dec. 2, 2019

(65) Prior Publication Data

US 2020/0104642 A1    Apr. 2, 2020

Related U.S. Application Data

(63) Continuation of application No. PCT/CN2018/116574, filed on Nov. 21, 2018.

(30) Foreign Application Priority Data

Apr. 25, 2018    (CN) .................. 201810380453.X

(51) Int. Cl.
*G06K 9/62*    (2022.01)
*G06N 3/04*    (2006.01)
(Continued)

(52) U.S. Cl.
CPC ......... *G06K 9/6257* (2013.01); *G06K 9/6263* (2013.01); *G06N 3/0454* (2013.01); *G06N 3/08* (2013.01); *G06V 10/40* (2022.01)

(58) Field of Classification Search
CPC ...... G06K 9/6257; G06K 9/46; G06K 9/6263; G06K 9/4628; G06K 9/6273; G06K 9/6256; G06K 9/6267; G06N 3/0454; G06N 3/08
(Continued)

(56) References Cited

U.S. PATENT DOCUMENTS

2017/0076224 A1    3/2017  Munawar
2017/0083829 A1*   3/2017  Kang .................. G06N 3/0454
(Continued)

FOREIGN PATENT DOCUMENTS

CN    106355248 A    1/2017
CN    107247989 A    10/2017
(Continued)

OTHER PUBLICATIONS

Adriana Romero et al. "Fitnets: Hints for Thin Deep Nets", issued on Mar. 27, 2015, <ICLR 2015>, Section 1, 2, 3.2, Table 3.
(Continued)

*Primary Examiner* — Juan A Torres
(74) *Attorney, Agent, or Firm* — Syncoda LLC; Feng Ma

(57) ABSTRACT

An image processing method includes: inputting a to-be-processed image into a neural network; and forming discrete feature data of the to-be-processed image via the neural network, where the neural network is trained based on guidance information, and during the training process, the neural network is taken as a student neural network; the guidance information includes: a difference between discrete feature data formed by a teacher neural network for an image sample and discrete feature data formed by the student neural network for the image sample.

18 Claims, 12 Drawing Sheets

(51) Int. Cl.
*G06N 3/08* (2006.01)
*G06V 10/40* (2022.01)

(58) Field of Classification Search
USPC .......................................................... 382/157
See application file for complete search history.

(56) References Cited

U.S. PATENT DOCUMENTS

| | | | |
|---|---|---|---|
| 2018/0268292 A1* | 9/2018 | Choi | G06K 9/6217 |
| 2018/0336465 A1* | 11/2018 | Kim | G06N 7/005 |
| 2018/0365564 A1 | 12/2018 | Huang et al. | |
| 2019/0034764 A1* | 1/2019 | Oh | G06F 21/31 |
| 2019/0051290 A1* | 2/2019 | Li | G10L 25/30 |
| 2019/0287515 A1* | 9/2019 | Li | G10L 15/063 |
| 2019/0325308 A1* | 10/2019 | Chung | G06F 40/44 |
| 2020/0349435 A1* | 11/2020 | Gupta | G06N 3/0454 |
| 2020/0357384 A1* | 11/2020 | Kim | G10L 15/183 |
| 2020/0380313 A1* | 12/2020 | Keshwani | G06K 9/66 |

FOREIGN PATENT DOCUMENTS

| | | |
|---|---|---|
| CN | 107358293 A | 11/2017 |
| CN | 107578453 A | 1/2018 |
| CN | 107743235 A | 2/2018 |
| CN | 108830288 A | 11/2018 |
| JP | 2017040972 A | 2/2017 |

OTHER PUBLICATIONS

Pete Warden. "How to Quantize Neural Networks with TensorFlow", issued on May 4, 2016, <Pete Warden"s blog>, p. 2.

Asit Mishra et al."Apprentice: Using KD Techniques to Improve Low-Precision Network Accuracy", issued on Nov. 15, 2017, <arXiv>, pp. 1-15.

Dipankar Das et al. "Mixed Precision Neural Networks Training of Convolutional Using Integer Operations", issued on Feb. 23, 2018, <arXiv>, pp. 1-11.

Jiaxiang Wu et al."Quantized Convolutional Neural Networks for Mobile Devices", issued on Dec. 12, 2016, <IEEE>, pp. 4820-4828.

First Office Action of the Chinese application No. 201810380453.X, dated May 9, 2020.

K. Simonyan and A. Zisserman Very deep convolutional networks for large-scale image recognition arXiv preprint arXiv: 1409.1556, Apr. 10, 2015.

A.G.Howard,M.Zhu,B.Chen,D.Kalenichenko,W.Wang, T. Weyand, M. Andreetto, and H. Adam. Mobilenets: Efficient convolutional neural networks for mobile vision applications. arXiv preprint arXiv:1704.04861, Apr. 17, 2017.

X. Zhang, X. Zhou, M. Lin, and J. Sun. Shufflenet: An extremely efficient convolutional neural network for mobile devices. arXiv: 1707.01083, Dec. 7, 2017.

Y. He, X. Zhang, and J. Sun. Channel pruning for accelerating very deep neural networks. arXiv preprint arXiv: 1707.06168, Aug. 21, 2017.

P. Molchanov, S. Tyree, T. Karras, T. Aila, and J. Kautz. Pruning convolutional neural networks for resource efficient inference. Jun. 8, 2016.

Q. Li, S. Jin, and J. Yan. Mimicking very efficient network for object detection. In Proceedings of the IEEE Conference an Computer Vision and Pattern Recognition, pp. 6356-6364, 2017.

Yi Wei, Xinyu Pan, Hongwei Qin, Wanli Ouyang, Junjie Yan:"Quantization Mimic: Towards Very Tiny CNN for Object Detection", Sep. 13, 2018.

International Search Report in the international application No. PCT/CN2018/116574, dated Feb. 21, 2019.

Kenta saigyo, Takayoshi yamashita, Hiromasa fujiyoshi, "Compacting DNN by hierarchical Knowledge Distillation", Fekai Technical Research Report, General Club FeKAI, Japan, Oct. 5, 2017, vol. 117 No. 238, pp. 175-180.

First Office Action of the Japanese application No. 2020-533824, dated Aug. 17, 2021.

* cited by examiner

IMAGE PROCESSING METHODS, TRAINING METHODS, APPARATUSES, DEVICES, MEDIA, AND PROGRAMS

CROSS-REFERENCE TO RELATED APPLICATIONS

The present application is a continuation of International Application No. PCT/CN2018/116574 filed on Nov. 21, 2018, which claims priority to Chinese Patent Application No. 201810380453.X filed on Apr. 25, 2018. The disclosures of these applications are hereby incorporated by reference in their entirety.

BACKGROUND

Neural networks (such as convolutional neural networks) are widely applied in many computer vision tasks.

SUMMARY

The present disclosure relates to computer vision technologies, and in particular to image processing methods, image processing apparatuses, neural network training methods, neural network training apparatuses, electronic devices, computer-readable storage media, and computer programs.

Implementations of the present disclosure provide technical solutions for image processing and neural network training.

According to one aspect of the implementations of the present disclosure, an image processing method is provided. The method includes: inputting a to-be-processed image into a neural network; and forming discrete feature data of the to-be-processed image via the neural network, where the neural network is trained based on guidance information, and during the training process, the neural network is taken as a student neural network, the guidance information including: a difference between discrete feature data formed by a teacher neural network for an image sample and discrete feature data formed by the student neural network for the image sample.

In one implementation of the present disclosure, the neural network includes: a neural network whose size is no more than 2 MB.

In another implementation of the present disclosure, the forming discrete feature data of the to-be-processed image via the neural network includes: forming floating-point feature data of the to-be-processed image via the neural network, and quantizing the floating-point feature data into the discrete feature data of the to-be-processed image.

In another implementation of the present disclosure, the forming floating-point feature data of the to-be-processed image via the neural network includes: extracting floating-point feature data from the to-be-processed image via the neural network, and converting the extracted floating-point feature data into floating-point feature data satisfying a predetermined requirement to form the floating-point feature data of the to-be-processed image.

In yet another implementation of the present disclosure, the converting the extracted floating-point feature data into floating-point feature data satisfying a predetermined requirement includes at least one of: converting the floating-point feature data into floating-point feature data with a predetermined number of channels; or converting the floating-point feature data into floating-point feature data with a predetermined size.

In yet another implementation of the present disclosure, the method further includes: performing corresponding vision task processing on the to-be-processed image via the neural network according to the discrete feature data of the to-be-processed image.

In yet another implementation of the present disclosure, the guidance information further includes: a difference between a vision task processing result output by the student neural network for the image sample and tagging information of the image sample.

In yet another implementation of the present disclosure, the performing corresponding vision task processing on the to-be-processed image via the neural network according to the discrete feature data of the to-be-processed image includes: performing classification processing on the to-be-processed image via the neural network according to the discrete feature data of the to-be-processed image; or performing object detection processing on the to-be-processed image according to the discrete feature data of the to-be-processed image.

In yet another implementation of the present disclosure, the guidance information further includes: a difference between a classification processing result output by the student neural network for the image sample and classification tagging information of the image sample; or a difference between an object detection processing result output by the student neural network for the image sample and detection box tagging information of the image sample.

In yet another implementation of the present disclosure, a process of training the neural network includes: inputting an image sample into a student neural network and a teacher neural network, respectively; forming discrete feature data of the image sample via the student neural network and the teacher neural network respectively; and performing supervised learning on the student neural network according to guidance information, where the guidance information includes: a difference between discrete feature data formed by the teacher neural network for the image sample and discrete feature data formed by the student neural network for the image sample.

In yet another implementation of the present disclosure, the process of training the neural network further includes: performing vision task processing on the image sample via the student neural network according to the discrete feature data of the image sample; the performing supervised learning on the student neural network according to guidance information includes: performing supervised learning on the student neural network by using, as guidance information, the difference between the discrete feature data formed by the teacher neural network for the image sample and the discrete feature data formed by the student neural network for the image sample and a difference between a vision task processing result output by the student neural network and tagging information of the image sample.

In yet another implementation of the present disclosure, the teacher neural network includes: a successfully trained floating-point teacher neural network configured to form floating-point feature data for an input image, and perform vision task processing on the input image according to the floating-point feature data; and a quantization auxiliary unit configured to convert the floating-point feature data formed by the floating-point teacher neural network into discrete feature data, and provide the discrete feature data to the floating-point teacher neural network, so that the floating-point teacher neural network performs vision task processing on the input image according to the discrete feature data.

In yet another implementation of the present disclosure, a process of training the teacher neural network includes: inputting an image sample into a successfully trained floating-point teacher neural network; extracting floating-point feature data of the image sample via the successfully trained floating-point teacher neural network, converting the floating-point feature data into discrete feature data via the quantization auxiliary unit, and performing vision task processing on the image sample via the successfully trained floating-point teacher neural network according to the discrete feature data; and performing network parameter adjustment on the successfully trained floating-point teacher neural network by using a difference between a vision task processing result and tagging information of the image sample as guidance information.

In yet another implementation of the present disclosure, a process of training the floating-point teacher neural network includes: inputting an image sample into a to-be-trained floating-point teacher neural network; extracting floating-point feature data of the image sample via the to-be-trained floating-point teacher neural network, and performing vision task processing on the image sample according to the floating-point feature data; and performing supervised learning on the to-be-trained floating-point teacher neural network by using a difference between a vision task processing result and tagging information of the image sample as guidance information.

According to another aspect of the implementations of the present disclosure, a neural network training method is provided. In a training process, a to-be-trained neural network is used as a student neural network, the training method including: inputting an image sample into a student neural network and a teacher neural network, respectively; forming discrete feature data of the image sample via the student neural network and the teacher neural network respectively; and performing supervised learning on the student neural network according to guidance information, where the guidance information includes: a difference between discrete feature data formed by the teacher neural network for the image sample and discrete feature data formed by the student neural network for the image sample.

In one implementation of the present disclosure, the training process of using the neural network as a student neural network further includes: performing vision task processing on the image sample via the student neural network according to the discrete feature data of the image sample; the performing supervised learning on the student neural network according to guidance information includes: performing supervised learning on the student neural network by using, as guidance information, the difference between the discrete feature data formed by the teacher neural network for the image sample and discrete feature data formed by the student neural network for the image sample and the difference between a vision task processing result output by the student neural network and tagging information of the image sample.

In still another implementation of the present disclosure, the teacher neural network includes: a successfully trained floating-point teacher neural network configured to form floating-point feature data for an input image, and perform vision task processing on the input image according to the floating-point feature data; and a quantization auxiliary unit configured to convert the floating-point feature data formed by the floating-point teacher neural network into discrete feature data, and provide the discrete feature data to the floating-point teacher neural network, so that the floating-point teacher neural network performs vision task processing on the input image according to the discrete feature data.

In yet another implementation of the present disclosure, a process of training the teacher neural network includes: inputting an image sample into a successfully trained floating-point teacher neural network; extracting floating-point feature data of the image sample via the successfully trained floating-point teacher neural network, converting the floating-point feature data into discrete feature data via the quantization auxiliary unit, and performing vision task processing on the image sample via the successfully trained floating-point teacher neural network according to the discrete feature data; and performing network parameter adjustment on the successfully trained floating-point teacher neural network by using a difference between a vision task processing result and tagging information of the image sample as guidance information.

In yet another implementation of the present disclosure, a process of training the floating-point teacher neural network includes: inputting an image sample into a to-be-trained floating-point teacher neural network; extracting floating-point feature data of the image sample via the to-be-trained floating-point teacher neural network, and performing vision task processing on the image sample according to the floating-point feature data; and performing supervised learning on the to-be-trained floating-point teacher neural network by using a difference between a vision task processing result and tagging information of the image sample as guidance information.

According to still aspect of the implementations of the present disclosure, an image processing apparatus is provided. The apparatus includes a memory storing processor-executable instructions, and a processor arranged to execute the stored processor-executable instructions to perform steps of: inputting a to-be-processed image into a neural network; forming discrete feature data of the to-be-processed image, where the neural network is trained based on guidance information, and during the training process, the neural network is taken as a student neural network, the guidance information including: a difference between discrete feature data formed by a teacher neural network for an image sample and discrete feature data formed by the student neural network for the image sample.

In one implementation of the present disclosure, the neural network includes: a neural network whose size is no more than 2 MB.

In another implementation of the present disclosure, the forming discrete feature data of the to-be-processed image via the neural network includes: forming floating-point feature data of the to-be-processed image via the neural network, and quantizing the floating-point feature data into discrete feature data of the to-be-processed image.

In yet another implementation of the present disclosure, the forming floating-point feature data of the to-be-processed image via the neural network includes: extracting floating-point feature data from the to-be-processed image via the neural network, and converting the extracted floating-point feature data into floating-point feature data satisfying a predetermined requirement to form floating-point feature data of the to-be-processed image.

In yet another implementation of the present disclosure, the converting the extracted floating-point feature data into floating-point feature data satisfying a predetermined requirement includes at least one of: converting the floating-point feature data into floating-point feature data with a predetermined number of channels; or converting the floating-point feature data into floating-point feature data with a predetermined size.

In yet another implementation of the present disclosure, the processor is arranged to execute the stored processor-executable instructions to further perform a step of: performing corresponding vision task processing on the to-be-processed image according to the discrete feature data of the to-be-processed image.

In yet another implementation of the present disclosure, the guidance information further includes: a difference between a vision task processing result output by the student neural network for the image sample and tagging information of the image sample.

In yet another implementation of the present disclosure, the performing corresponding vision task processing on the to-be-processed image via the neural network according to the discrete feature data of the to-be-processed image includes: performing classification processing on the to-be-processed image according to the discrete feature data of the to-be-processed image; or performing object detection processing on the to-be-processed image according to the discrete feature data of the to-be-processed image.

In yet another implementation of the present disclosure, the guidance information further includes: a difference between a classification processing result output by the student neural network for the image sample and classification tagging information of the image sample; or a difference between an object detection processing result output by the student neural network for the image sample and detection box tagging information of the image sample.

In yet another implementation of the present disclosure, a process of training the neural network includes: inputting an image sample into a student neural network and a teacher neural network, respectively; forming discrete feature data of the image sample via the student neural network and the teacher neural network, respectively; and performing supervised learning on the student neural network according to guidance information, where the guidance information includes: a difference between discrete feature data formed by the teacher neural network for the image sample and discrete feature data formed by the student neural network for the image sample.

In yet another implementation of the present disclosure, the process of training the neural network further includes: performing vision task processing on the image sample according to the discrete feature data of the image sample; the performing supervised learning on the student neural network according to guidance information includes: performing supervised learning on the student neural network by using, as guidance information, the difference between the discrete feature data formed by the teacher neural network for the image sample and the discrete feature data formed by the student neural network for the image sample and the difference between a vision task processing result output by the student neural network and tagging information of the image sample.

In yet another implementation of the present disclosure, the teacher neural network includes: a successfully trained floating-point teacher neural network configured to form floating-point feature data for an input image, and perform vision task processing on the input image according to the floating-point feature data; and a quantization auxiliary unit configured to convert the floating-point feature data formed by the floating-point teacher neural network into discrete feature data, and provide the discrete feature data to the floating-point teacher neural network, so that the floating-point teacher neural network performs vision task processing on the input image according to the discrete feature data.

In yet another implementation of the present disclosure, a process of training the teacher neural network includes: inputting an image sample into a successfully trained floating-point teacher neural network; extracting floating-point feature data of the image sample via the successfully trained floating-point teacher neural network, converting the floating-point feature data into discrete feature data via the quantization auxiliary unit, and performing vision task processing on the image sample via the successfully trained floating-point teacher neural network according to the discrete feature data; and performing network parameter adjustment on the successfully trained floating-point teacher neural network by using a difference between a vision task processing result and tagging information of the image sample as guidance information.

In yet another implementation of the present disclosure, a process of training the floating-point teacher neural network includes: inputting an image sample into a to-be-trained floating-point teacher neural network; extracting floating-point feature data of the image sample via the to-be-trained floating-point teacher neural network, and performing vision task processing on the image sample according to the floating-point feature data; and performing supervised learning on the to-be-trained floating-point teacher neural network by using a difference between a vision task processing result and tagging information of the image sample as guidance information.

According to yet aspect of the implementations of the present disclosure, a neural network training apparatus is provided. A to-be-trained neural network is used as a student neural network, the apparatus includes a memory storing processor-executable instructions, and a processor arranged to execute the stored processor-executable instructions to perform steps of: inputting an image sample into a student neural network and a teacher neural network, respectively; forming discrete feature data of the image sample via the student neural network and the teacher neural network respectively; performing supervised learning on the student neural network according to guidance information, where the guidance information includes: a difference between discrete feature data formed by the teacher neural network for the image sample and discrete feature data formed by the student neural network for the image sample.

In one implementation of the present disclosure, the training process of using the neural network as a student neural network further includes: performing vision task processing on the image sample according to the discrete feature data of the image sample; the performing supervised learning on the student neural network according to guidance information includes: performing supervised learning on the student neural network by using, as guidance information, the difference between the discrete feature data formed by the teacher neural network for the image sample and the discrete feature data formed by the student neural network for the image sample and a difference between a vision task processing result output by the student neural network and tagging information of the image sample.

In another implementation of the present disclosure, the teacher neural network includes: a successfully trained floating-point teacher neural network configured to form floating-point feature data for an input image, and perform vision task processing on the input image according to the floating-point feature data; and a quantization auxiliary unit configured to convert the floating-point feature data formed by the floating-point teacher neural network into discrete feature data, and provide the discrete feature data to the floating-point teacher neural network, so that the floating-point teacher neural network performs vision task processing on the input image according to the discrete feature data.

In yet another implementation of the present disclosure, a process of training the teacher neural network: inputting an image sample into a successfully trained floating-point teacher neural network; extracting floating-point feature data of the image sample via the successfully trained floating-point teacher neural network, converting the floating-point feature data into discrete feature data via a quantization auxiliary unit, and performing vision task processing on the image sample via the successfully trained floating-point teacher neural network according to the discrete feature data; and performing network parameter adjustment on the successfully trained floating-point teacher neural network by using a difference between a vision task processing result and tagging information of the image sample as guidance information.

In yet another implementation of the present disclosure, a process of training the floating-point teacher neural network includes: inputting an image sample into a to-be-trained floating-point teacher neural network; extracting floating-point feature data of the image sample via the to-be-trained floating-point teacher neural network, and performing vision task processing on the image sample according to the floating-point feature data; and performing supervised learning on the to-be-trained floating-point teacher neural network by using a difference between a vision task processing result and tagging information of the image sample as guidance information.

According to yet aspect of the implementations of the present disclosure, an electronic device is provided, including a memory configured to store a computer program; and a processor configured to execute the computer program stored in the memory, where when the computer program is executed, any one of the method implementations of the present disclosure is achieved.

According to yet aspect of the implementations of the present disclosure, a computer-readable storage medium having stored thereon instructions that, when executed by a processor, cause the processor to implement any one of the implementations of the present disclosure.

According to yet aspect of the implementations of the present disclosure, provided is a computer program including computer instructions is provided, where when the computer instructions run in a processor of a device, any one of the implementations of the present disclosure is achieved.

The following further describes in detail the technical solutions of the present disclosure with reference to the accompanying drawings and implementations.

BRIEF DESCRIPTION OF THE DRAWINGS

The accompanying drawings constituting a part of the specification describe the implementations of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
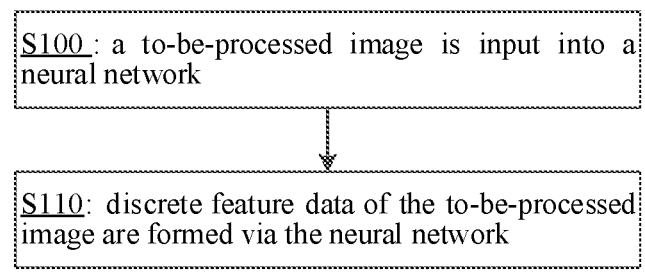
FIG. 1 is a flowchart of one embodiment of an image processing method according to the present disclosure.

Various exemplary embodiments of the present disclosure are now described in detail with reference to the accompanying drawings. It should be noted that, unless otherwise stated, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

Some neural networks cannot be directly applied to electronic devices such as smart mobile phones and digital cameras due to factors such as a large amount of computations and parameters thereof. With compression technologies, neural networks can be usually scaled back and the running speed of the neural networks is increased. However, the accuracy of the neural networks can become poorer after the neural networks are compressed.

Various embodiments of the present disclosure can improve the accuracy of neural networks while the neural networks are scaled back and the running speed of the neural networks is increased.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart of one embodiment of an image processing method according to the present disclosure. As shown in FIG. 1, the method according to this embodiment includes: operation S100 and operation S110. The following describes in detail the operations in FIG. 1.

In S100, a to-be-processed image is input into a neural network.

In an optional example, the to-be-processed image in the present disclosure is a static image, such as a picture or photo, or a video frame in a dynamic video, for example, a video frame in a video captured by a camera apparatus. The to-be-processed image is a part of the to-be-processed original image (i.e., an image block segmented from the to-be-processed original image and including part of content of the to-be-processed original image), or the to-be-processed image includes a complete to-be-processed original image. Certainly, the to-be-processed image is a part of an image obtained after certain processing is performed on the to-be-processed original image, or the to-be-processed image includes complete content of the image obtained after certain processing is performed on the to-be-processed original image. The present disclosure does not limit the representation of the to-be-processed image.

In an optional example, the size of the to-be-processed image in the present disclosure is usually related to the requirement of a neural network for the size of an input image. For example, the size of the to-be-processed image is 256×256. In order to obtain a to-be-processed image having a predetermined size, in the present disclosure, scaling processing is performed on the to-be-processed image in corresponding proportion. The present disclosure does not limit the size of the to-be-processed image and the implementation of the scaling processing.

In an optional example, the neural network in the present disclosure is a neural network having a size no more than 2 MB. That is to say, the storage space of the neural network is no more than 2 MB. Compared to an existing neural network having a size of tens or even hundreds of megabytes, the neural network in the present disclosure is referred to as a minimal neural network.

In an optional example, the neural network in the present disclosure includes, but is not limited to, convolution layers, non-linear Relu layers, pooling layers, and fully connected layers. The neural network may be a deep neural network. The more the layers included in the neural network, the deeper the network. The neural network in the present disclosure may be a convolutional neural network. The structure of the neural network in the present disclosure can be flexibly designed according to actual vision task requirements. Embodiments of the present disclosure do not limit the structure of the neural network. For example, the structure of the neural network in the present disclosure may use, but not limited to, a structure used by a neural network such as ALexNet, a Deep Residual Network (ResNet), or a Visual Geometry Group Network (VGGnet).

In an optional example, the neural network in the present disclosure is trained based on knowledge transfer. That is to say, during the training process, the neural network in the present disclosure is taken as a student neural network. In addition, during the process of training the neural network, guidance information used usually includes: a difference between discrete feature data formed by a teacher neural network for an image sample and discrete feature data formed by the student neural network for the image sample. That is to say, the discrete feature data formed by the teacher neural network for the image sample is used as a supervision signal for training the student neural network. The loss functions used for training the neural network include L2 loss function, etc. Reference is made to the descriptions of FIGS. 5 to 7 for the process of training the neural network. Descriptions are not made herein repeatedly. In addition, it should be noted that, the discrete feature data in the present disclosure may be referred to as fixed-point feature data. In the present disclosure, the feature data may include at least one feature vector, at least one feature map, or other form.

In an optional example, the network parameters of the teacher neural network in the present disclosure are not necessarily fixed-point network parameters. That is to say, the network parameters of the teacher neural network in the present disclosure may be floating-point network parameters, and the teacher neural network may perform floating-point arithmetic. However, the feature data finally formed by the teacher neural network is discrete feature data. That is, floating-point feature data extracted from an image by the teacher neural network is quantized to form discrete feature data. Hence, the teacher neural network in the present disclosure may be referred to as a quantization teacher neural network. When a student neural network is trained by using a quantization teacher neural network, the knowledge of the quantization teacher neural network can be transferred to the student neural network, and the network parameters of the student neural network are not necessarily fixed-point network parameters. That is to say, the network parameters of the student neural network in the present disclosure may be floating network parameters, and the student neural network may perform floating-point arithmetic, so that after the student neural network is successfully trained, the neural network may not be limited by a specific instruction set and a specific device, thereby facilitating improvement in the application range of the neural network.

In an optional example, the operation S100 is performed by a processor by invoking a corresponding instruction stored in a memory, or is performed by an image input module 1000 run by the processor.

In S110, discrete feature data of the to-be-processed image are formed via the neural network.

In an optional example, the neural network in the present disclosure first forms floating-point feature data of the to-be-processed image, and then the neural network quantizes the floating-point feature data into discrete feature data. The discrete feature data obtained after quantization is discrete feature data of the to-be-processed image formed by the neural network. In an optional example of forming the discrete feature data of the to-be-processed image by the neural network in the present disclosure, the neural network extracts floating-point feature data from the to-be-processed image so as to obtain a piece of floating-point feature data (hereinafter referred to as initial floating-point feature data). In a usual case, the floating-point feature data does not satisfy a requirement predetermined for floating-point feature data. Therefore, the neural network may convert the floating-point feature data obtained initially into floating-point feature data satisfying the predetermined requirement. The floating-point feature data satisfying the predetermined requirement is floating-point feature data of the to-be-processed image formed by the neural network.

In an optional example, the mode of quantizing the floating-point feature data into discrete feature data by the neural network in the present disclosure includes: converting floating-point numbers in the feature data into corresponding fixed-point numbers, for example, converting floating-point numbers within an interval [k−0.5, k+0.5] in the feature data into k, where k is an integer. It is not limited that the implementation of quantizing the floating-point feature data into discrete feature data by the neural network in the present disclosure.

In an optional example, the predetermined requirement in the present disclosure can be flexibly designed according to actual requirements. For example, the predetermined requirement includes: at least one of a requirement for the number of channels or a requirement for the size of feature data. Optionally, the predetermined requirement may specify that the feature data should have a predetermined number of channels, and the predetermined requirement may specify that the feature data should have a predetermined size. That is, the length and width of the feature data should satisfy the requirement.

In an optional example, the number of channels of the initial floating-point feature data formed by the neural network in the present disclosure can be set according to actual requirements. For example, the number of channels of the initial floating-point feature data formed by the neural network in the present disclosure is one thirty-second of the number of channels of a Visual Geometry Group (VGG) neural network, while the number of channels of discrete feature data obtained after the conversion is the number of channels of the VGG neural network. In the present disclosure, the initial floating-point feature data may be converted into floating-point feature data with a predetermined number of channels by using technologies such as convolution layers. It is not limited that the implementation of converting initial floating-point feature data into floating-point feature data having a predetermined number of channels in the present disclosure.

In an optional example, the initial floating-point feature data may be converted into floating-point feature data with a predetermined size by using technologies such as upsampling. The upsampling may be implemented by means of deconvolution layers. It is not limited the implementation of converting initial floating-point feature data into floating-point feature data having a predetermined size in the present disclosure.

In an optional example, the neural network in the present disclosure is not only configured to form discrete feature data of the to-be-processed image, but also configured to perform corresponding vision task processing on the to-be-processed image according to the discrete feature data of the to-be-processed image. The vision task processing in the present disclosure can be flexibly set according to actual requirements. For example, the vision task processing is classification processing or object detection processing. That is to say, the neural network in the present disclosure classifies the to-be-processed image according to the discrete feature data of the to-be-processed image formed thereby to determine a class to which the to-be-processed image belongs (classes such as cat or dog or person or vehicle); the neural network in the present disclosure performs object detection processing on in the to-be-processed image according to the discrete feature data of the to-be-processed image formed thereby to determine the position and class of a detection box in the to-be-processed image (for example, the coordinates of two vertices on diagonal lines of the detection box and the class of the detection box). The detection box in the present disclosure may also be referred to as a circumscribed box. It is not limited that the representation of the vision task processing in the present disclosure.

In an optional example, in the case that the neural network in the present disclosure performs corresponding vision task processing on the to-be-processed image, guidance information used by the neural network in the present disclosure usually includes: a difference between a vision task processing result output by the neural network and tagging information of an image sample. That is to say, the discrete feature data formed by a teacher neural network for the image sample is used as a supervision signal for training a student neural network. Meanwhile, tagging information of the image sample is also used as a supervision signal for training the student neural network.

In an optional example, in the case that the neural network in the present disclosure is not only configured to form discrete feature data of the to-be-processed image, but also configured to perform classification processing on the to-be-processed image according to the discrete feature data of the to-be-processed image, during the process of training the neural network, the discrete feature data formed by the teacher neural network for the image sample and classification tagging information of the image sample are both used as supervision signals for training the student neural network. That is to say, a difference between a classification processing result output by the student neural network and the classification tagging information of the image sample, and a difference between the discrete feature data formed by the teacher neural network for the image sample and discrete feature data formed by the student neural network for the image sample are both used as guidance information for training the student neural network.

In an optional example, in the case that the neural network in the present disclosure is not only configured to form discrete feature data of the to-be-processed image, but also configured to perform object detection processing on the to-be-processed image according to the discrete feature data of the to-be-processed image, during the process of training the neural network, the discrete feature data formed by the teacher neural network for the image sample and detection box tagging information of the image sample are both used as supervision signals for training the student neural network. That is to say, a difference between an object detection processing result (such as position and classification information of the detection box) output by the student neural network and the detection box tagging information (such as detection box position tagging information and classification tagging information) of the image sample, and a difference between the discrete feature data formed by the teacher neural network for the image sample and discrete feature data formed by the student neural network for the image sample are both used as guidance information for training the student neural network.

In an optional example, the operation S110 is performed by a processor by invoking a corresponding instruction stored in a memory, or is performed by a neural network 1010 run by the processor.

Figure 2:
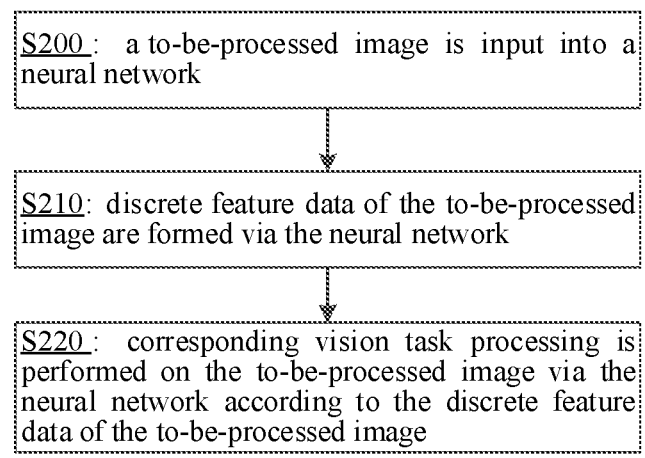
FIG. 2 is a flowchart of another embodiment of an image processing method according to the present disclosure.

FIG. 2 is a flowchart of another embodiment of an image processing method according to the present disclosure. As shown in FIG. 2, the method according to this embodiment includes: operation S200, operation S210, and operation S220. The following describes in detail the operations in FIG. 2.

In S200, a to-be-processed image is input into a neural network.

In an optional example, the neural network in the present disclosure usually includes: a neural network whose size is no more than 2 MB. During a training process, the neural network is taken as a student neural network. During the process of training the neural network, guidance information used usually includes: a difference between discrete feature data formed by a teacher neural network for an image sample and discrete feature data formed by the student neural network for the image sample, and a difference between a vision task processing result obtained after performing vision tasking processing on the image sample by the student neural network and tagging information of the image sample. That is to say, the discrete feature data formed by the teacher neural network for the image sample and the tagging information of the image sample are used as supervision signals for training the student neural network. The loss functions used for training the neural network include L2 loss function, etc. Reference is made to the descriptions for S100 in the foregoing method implementations for the content such as the network structure and the to-be-processed image involved in the operation. Descriptions are not made herein in detail.

In an optional example, the operation S200 is performed by a processor by invoking a corresponding instruction stored in a memory, or is performed by an image input module 1000 run by the processor.

In S210, discrete feature data of the to-be-processed image are formed via the neural network.

In an optional example, the neural network first forms floating-point feature data of the to-be-processed image. Optionally, the neural network extracts floating-point feature data from the to-be-processed image, and converts the extracted floating-point feature data into floating-point feature data satisfying a predetermined requirement (for example, converting the floating-point feature data into floating-point feature data with a predetermined number of channels, and for another example, converting the floating-point feature data into floating-point feature data with a predetermined size), so as to form floating-point feature data of the to-be-processed image. The neural network forms the floating-point feature data of the to-be-processed image, and then quantizes the floating-point feature data into discrete feature data of the to-be-processed image, for example, converting floating-point numbers in the floating-point feature data into corresponding fixed-point numbers. Reference is made to related descriptions for S110 in the foregoing method implementations for the content of the operation. Descriptions are not made herein in detail.

In S220, corresponding vision task processing is performed on the to-be-processed image via the neural network according to the discrete feature data of the to-be-processed image. The vision task processing can be flexibly set according to actual requirements. Reference is made to related descriptions for S110 in the foregoing method implementations for the content of the operation. Descriptions are not made herein in detail.

In an optional example, the operations S210 and S220 are performed by a processor by invoking a corresponding instruction stored in a memory, or are performed by a neural network 1010 run by the processor.

Figure 3:
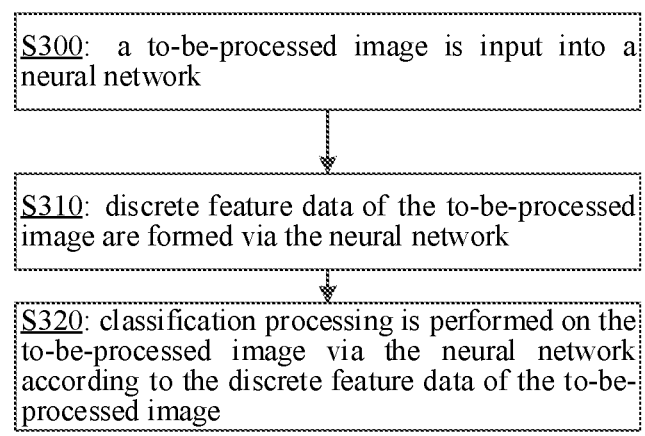
FIG. 3 is a flowchart of still another embodiment of an image processing method according to the present disclosure.

FIG. 3 is a flowchart of still another embodiment of an image processing method according to the present disclosure. As shown in FIG. 3, the method according to this embodiment includes: operation S300, operation S310, and operation S320. The following describes in detail the operations in FIG. 3.

In S300, a to-be-processed image is input into a neural network.

In an optional example, the neural network in the present disclosure usually includes: a neural network whose size is no more than 2 MB. During a training process, the neural network is taken as a student neural network. During the process of training the neural network, guidance information used usually includes: a difference between discrete feature data formed by a teacher neural network for an image sample and discrete feature data formed by the student neural network for the image sample, and a difference between a classification processing result obtained after performing classification processing on the image sample by the student neural network and classification tagging information of the image sample. That is to say, the discrete feature data formed by the teacher neural network for the image sample and the classification tagging information of the image sample are used as supervision signals for training the student neural network. The loss functions used for training the neural network include L2 loss function, etc. Reference is made to the description for S100 in the foregoing method implementations for the content such as the network structure and the to-be-processed image involved in the operation. Descriptions are not made herein in detail.

In an optional example, the operation S300 is performed by a processor by invoking a corresponding instruction stored in a memory, or is performed by an image input module 1000 run by the processor.

In S310, discrete feature data of the to-be-processed image are formed via the neural network.

In an optional example, the neural network first forms floating-point feature data of the to-be-processed image. Optionally, the neural network extracts floating-point feature data from the to-be-processed image, and converts the extracted floating-point feature data into floating-point feature data satisfying a predetermined requirement (for example, converting the floating-point feature data into floating-point feature data with a predetermined number of channels, and for another example, converting the floating-point feature data into floating-point feature data with a predetermined size), so as to form floating-point feature data of the to-be-processed image. The neural network forms the floating-point feature data of the to-be-processed image, and then quantizes the floating-point feature data into discrete feature data of the to-be-processed image, for example, converting floating-point numbers in the floating-point feature data into corresponding fixed-point numbers. Reference is made to related descriptions for S110 in the foregoing method implementations for the content of the operation. Descriptions are not made herein in detail.

In S320, classification processing is performed on the to-be-processed image via the neural network according to the discrete feature data of the to-be-processed image. The number and content of the classes obtained after the classification can be flexibly set according to actual requirements.

In an optional example, the operations S310 and S320 are performed by a processor by invoking a corresponding instruction stored in a memory, or are performed by a neural network 1010 run by the processor.

Figure 4:
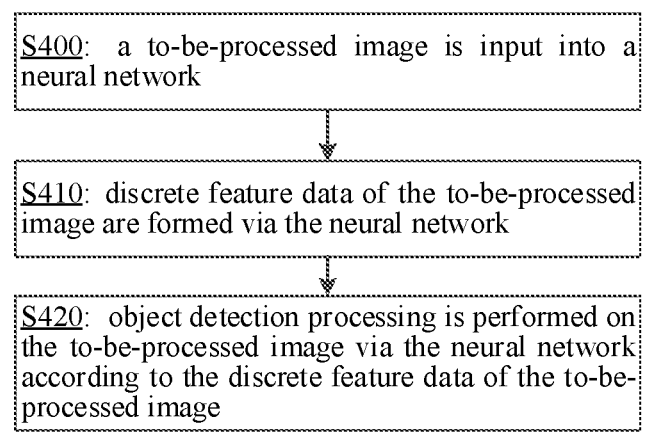
FIG. 4 is a flowchart of yet another embodiment of an image processing method according to the present disclosure.

FIG. 4 is a flowchart of yet another embodiment of an image processing method according to the present disclosure. As shown in FIG. 4, the method according to this embodiment includes: operation S400, operation S410, and operation S420. The following describes in detail the operations in FIG. 4.

In S400, a to-be-processed image is input into a neural network.

In an optional example, the neural network in the present disclosure usually includes: a neural network whose size is no more than 2 MB. during a training process, the neural network is taken as a student neural network. During the process of training the neural network, guidance information used usually includes: a difference between discrete feature data formed by a teacher neural network for an image sample and discrete feature data formed by the student neural network for the image sample, and a difference between an object detection processing result obtained after performing object detection processing on the image sample by the student neural network and detection box tagging information (such as detection box position tagging information and detection box classification tagging information) of the image sample. That is to say, the discrete feature data formed by the teacher neural network for the image sample and the detection box tagging information of the image sample are used as supervision signals for training the student neural network. The loss functions used for training the neural network include L2 loss function, etc. Reference is made to the description for S100 in the foregoing method implementations for the content such as the network structure and the to-be-processed image involved in the operation. Descriptions are not made herein in detail.

In an optional example, the operation S400 is performed by a processor by invoking a corresponding instruction stored in a memory, or is performed by an image input module 1000 run by the processor.

In S410, discrete feature data of the to-be-processed image are formed via the neural network.

In an optional example, the neural network first forms floating-point feature data of the to-be-processed image. Optionally, the neural network extracts floating-point feature data from the to-be-processed image, and converts the extracted floating-point feature data into floating-point feature data satisfying a predetermined requirement (for example, converting the floating-point feature data into floating-point feature data with a predetermined number of channels, and for another example, converting the floating-point feature data into floating-point feature data with a predetermined size), so as to form floating-point feature data of the to-be-processed image. The neural network forms the floating-point feature data of the to-be-processed image, and then quantizes the floating-point feature data into discrete feature data of the to-be-processed image, for example, converting floating-point numbers in the floating-point feature data into corresponding fixed-point numbers. Reference is made to related descriptions for S110 in the foregoing method implementations for the content of the operation. Descriptions are not made herein in detail.

In S420, object detection processing is performed on the to-be-processed image via the neural network according to the discrete feature data of the to-be-processed image. The number and content of the classes of the detection box involved in the object detection processing can be flexibly set according to actual requirements.

In an optional example, the operations S410 and S420 are performed by a processor by invoking a corresponding instruction stored in a memory, or are performed by a neural network 1010 run by the processor.

Figure 5:
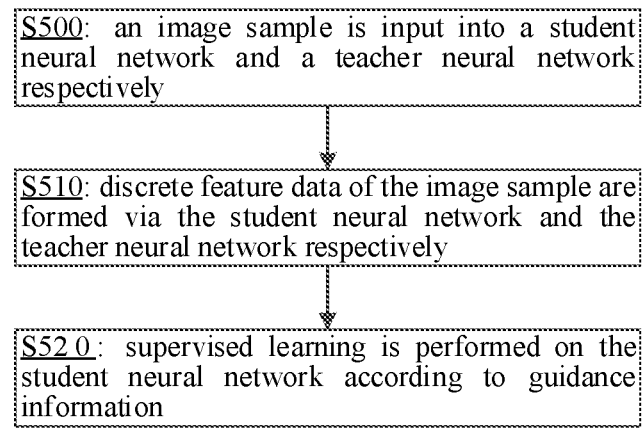
FIG. 5 is a flowchart of one embodiment of a neural network training method according to the present disclosure.

FIG. 5 is a flowchart of one embodiment of a neural network straining method according to the present disclosure. During a training process, a to-be-trained neural network is taken as a student neural network. As shown in FIG. 5, the method according to this embodiment includes: operation S500, operation S510, and operation S520. The following describes in detail the operations in FIG. 5.

In S500, an image sample is input into a student neural network and a teacher neural network respectively.

In an optional, in the present disclosure, the image sample is obtained from a training data set. The training data set in the present disclosure includes multiple image samples for training a neural network. In a usual case, each image sample has tagging information related to a corresponding vision task. For example, the tagging information of the image sample includes: classification tagging information of the image sample. For another example, the tagging information of the image sample also includes: detection box position tagging information and classification tagging information of the image sample. In the present disclosure, one or more image samples is read once from the training data set by means of random reading or sequentially reading in the order of image samples.

In an optional example, the size of the image sample provided for the student neural network and the teacher neural network in the present disclosure is usually related to the requirement of a neural network for the size of an input image. For example, the size of the image sample is 256× 256. In order to obtain image samples having a predetermined size, in the present disclosure, scaling processing is performed on the read image samples, so that each image sample provided for the student neural network and the teacher neural network has the predetermined size respectively. It is not limited the size of the image sample and the implementation of the scaling processing in the present disclosure.

In an optional example, the network parameters of the teacher neural network in the present disclosure are not necessarily fixed-point network parameters. That is to say, the network parameters of the teacher neural network in the present disclosure may be floating-point network parameters, and the teacher neural network may perform floating-point arithmetic. However, the feature data finally formed by the teacher neural network is discrete feature data. That is, floating-point feature data extracted from an image sample by the teacher neural network is quantized to form discrete feature data. In the present disclosure, the student neural network is trained by using the teacher neural network forming discrete feature data, so that the knowledge of the teacher neural network can be transferred to the student neural network, and the network parameters of the student neural network are not necessarily fixed-point network parameters.

As such, the network parameters of the student neural network according to some embodiments of the present disclosure may be floating network parameters, and the student neural network may perform floating-point arithmetic, so that after the student neural network is successfully trained, the neural network may not be limited by a specific instruction set and a specific device, thereby facilitating improvement in the application range of the neural network. In addition, the floating feature data obtained by the floating-point arithmetic is converted into discrete feature data by quantization. The discrete feature data maintains high accuracy, and matching between the discrete feature data output by the teacher neural network and the discrete feature data output by the student neural network is facilitated. Therefore, transfer of the knowledge of the teacher neural network to the student neural network is facilitated, thereby facilitating improvement in the neural network.

In S510, discrete feature data of the image sample are formed via the student neural network and the teacher neural network respectively.

In an optional example, the student neural network forms floating-point feature data of the image sample firstly. Optionally, the student neural network extracts floating-point feature data from the image sample, and converts the extracted floating-point feature data into floating-point feature data satisfying a predetermined requirement (for example, converting the floating-point feature data into floating-point feature data with a predetermined number of channels, and for another example, converting the floating-point feature data into floating-point feature data with a predetermined size), so as to form floating-point feature data of the image sample. The student neural network forms the floating-point feature data of the image sample, and then quantizes the floating-point feature data into discrete feature data of the image sample, for example, converting floating-point numbers in the floating-point feature data into corresponding fixed-point numbers. Likewise, the teacher neural network first forms floating-point feature data of the image sample. Optionally, the teacher neural network extracts floating-point feature data from the image sample, and converts the extracted floating-point feature data into floating-point feature data satisfying a predetermined requirement (for example, converting the floating-point feature data into floating-point feature data with a predetermined number of channels, and for another example, converting the floating-point feature data into floating-point feature data with a predetermined size), so as to form floating-point feature data of the image sample. The teacher neural network forms the floating-point feature data of the image sample, and then quantizes the floating-point feature data into discrete feature data of the image sample, for example, converting floating-point numbers in the floating-point feature data into corresponding fixed-point numbers.

In an optional example, the operations S500 and S510 are performed by a processor by invoking a corresponding instruction stored in a memory, or are performed by an image sample input module 1020 run by the processor.

In S520, supervised learning is performed on the student neural network according to guidance information.

In an optional example, the guidance information in the present disclosure usually includes: a difference between discrete feature data formed by the teacher neural network for the image sample and discrete feature data formed by the student neural network for the image sample. In addition, the guidance information in the present disclosure further usually includes: a difference between a corresponding vision task processing result output by the student neural network and tagging information of the image sample. That is to say, the discrete feature data formed by the teacher neural network for the image sample is used as a supervision signal for training a student neural network. Meanwhile, the tagging information of the image sample is also used as a supervision signal for training the student neural network. According to the present disclosure, for the purpose of reducing the difference between the discrete feature data formed by the teacher neural network for the image sample and the discrete feature data formed by the student neural network for the image sample, and reducing the difference between the vision task processing result output by the student neural network and the tagging information of the image sample, supervised learning is performed on the student neural network by using corresponding loss functions (such as L2 loss function).

In an optional example, when the training of the student neural network meets a predetermined iteration condition, the training process is ended. The predetermined iteration condition in the present disclosure includes: the difference between the discrete feature data output by the student neural network and the discrete feature data output by the teacher neural network, and the difference between the vision task processing result output by the student neural network and the tagging information of the image sample both satisfy a predetermined difference requirement. If the differences satisfy the predetermined difference requirement, the training of the student neural network succeeds. The predetermined iteration condition in the present disclosure also includes: the number of image samples used for training the student neural network satisfies a predetermined number requirement. If the number of image samples used satisfies the predetermined number requirement but the differences do not satisfy the predetermined difference requirement, the training of the student neural network does not succeed. The successfully trained student neural network is configured to form discrete feature data of the to-be-processed image and perform vision task processing.

In an optional example, the operation S520 is performed by a processor by invoking a corresponding instruction stored in a memory, or is performed by a supervision module 1030 run by the processor.

Figure 6:
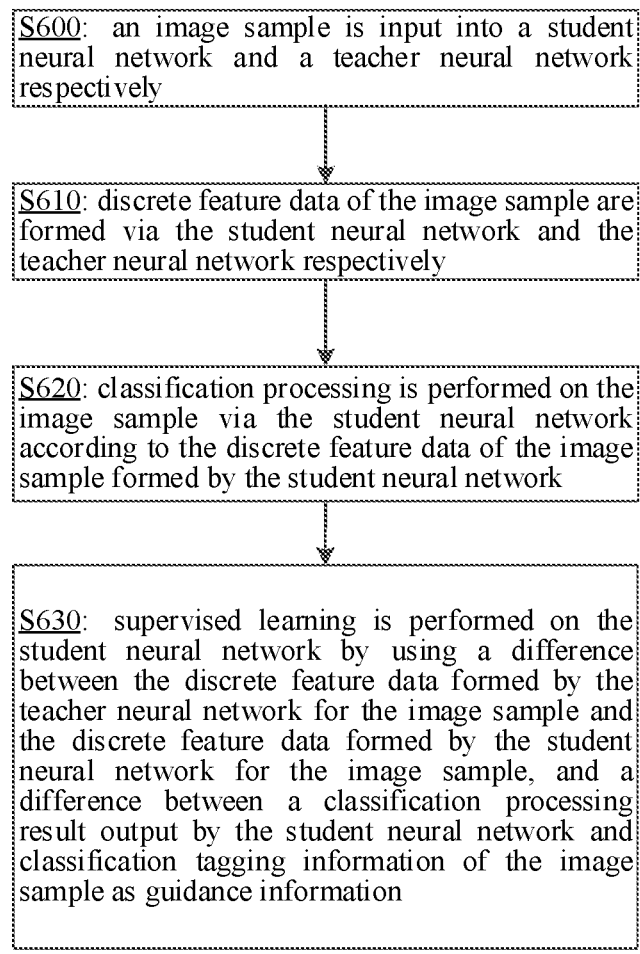
FIG. 6 is a flowchart of another embodiment of a neural network training method according to the present disclosure.

FIG. 6 is a flowchart of another embodiment of a neural network straining method according to the present disclosure. During a training process, a to-be-trained neural network is taken as a student neural network. As shown in FIG. 6, the method according to this embodiment includes: operation S600, operation S610, operation S620, and operation S630. The following describes in detail the operations in FIG. 6.

In S600, an image sample is input into a student neural network and a teacher neural network respectively. Reference is made to related descriptions for S500 in the foregoing method implementations for the content of the operation. Descriptions are not made herein in detail.

In S610, discrete feature data of the image sample are formed via the student neural network and the teacher neural network respectively. Reference is made to related descriptions for S510 in the foregoing method implementations for the content of the operation. Descriptions are not made herein in detail.

In an optional example, the operations S600 and S610 are performed by a processor by invoking a corresponding instruction stored in a memory, or are performed by an image sample input module 1020 run by the processor.

In S620, classification processing is performed on the image sample via the student neural network according to the discrete feature data of the image sample formed by the student neural network.

In S630, supervised learning is performed on the student neural network by using a difference between the discrete feature data formed by the teacher neural network for the image sample and the discrete feature data formed by the student neural network for the image sample, and a difference between a classification processing result output by the student neural network and classification tagging information of the image sample as guidance information.

In an optional example, according to the present disclosure, for the purpose of reducing the difference between the discrete feature data formed by the teacher neural network for the image sample and the discrete feature data formed by the student neural network for the image sample, and reducing the difference between the classification processing result output by the student neural network and the classification tagging information of the image sample, supervised learning is performed on the student neural network by using corresponding loss functions (such as L2 loss function).

In an optional example, when the training of the student neural network meets a predetermined iteration condition, the training process is ended. The predetermined iteration condition in the present disclosure includes: the difference between the discrete feature data output by the student neural network and the discrete feature data output by the teacher neural network, and the difference between the classification processing result output by the student neural network and the classification tagging information of the image sample both satisfy a predetermined difference requirement. If the differences satisfy the predetermined difference requirement, the training of the student neural network succeeds. The predetermined iteration condition in the present disclosure also includes: the number of image samples used for training the student neural network satisfies a predetermined number requirement. If the number of image samples used satisfies the predetermined number requirement but the differences do not satisfy the predetermined difference requirement, the training of the student neural network does not succeed. The successfully trained student neural network is configured to form discrete feature data of the to-be-processed image and perform classification processing.

In an optional example, the operations S620 and S630 are performed by a processor by invoking a corresponding instruction stored in a memory, or are performed by a supervision module 1030 run by the processor.

Figure 7:
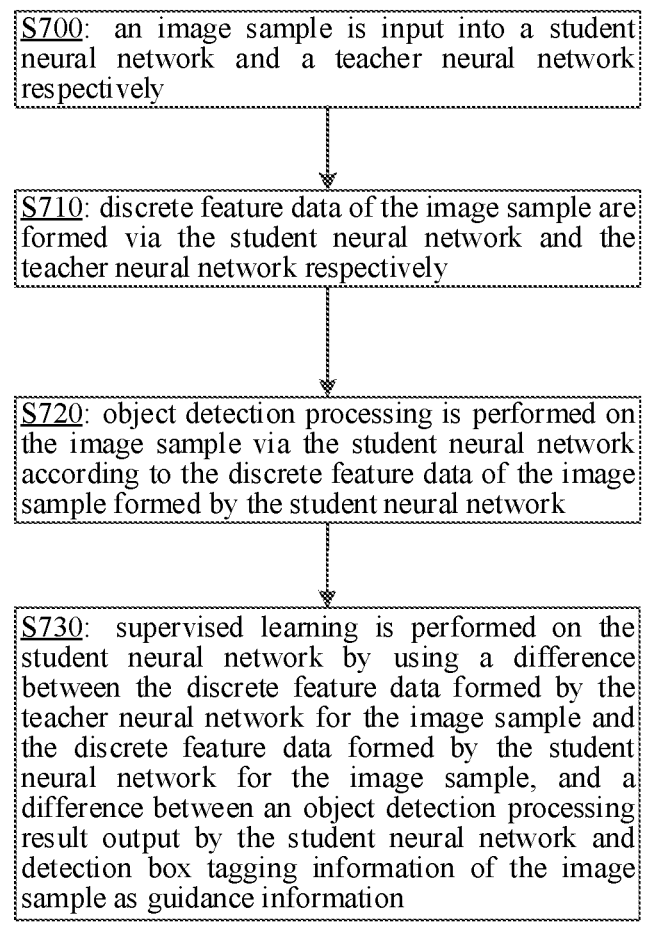
FIG. 7 is a flowchart of still another embodiment of a neural network training method according to the present disclosure.

FIG. 7 is a flowchart of yet another embodiment of a neural network straining method according to the present disclosure. During a training process, a to-be-trained neural network is taken as a student neural network. As shown in FIG. 7, the method according to this embodiment includes: operation S700, operation S710, operation S720, and operation S730. The following describes in detail the operations in FIG. 7.

In S700, an image sample is input into a student neural network and a teacher neural network respectively. Reference is made to related descriptions for S500 in the foregoing method implementations for the content of the operation. Descriptions are not made herein in detail.

In S710, discrete feature data of the image sample are formed via the student neural network and the teacher neural network respectively. Reference is made to related descriptions for S510 in the foregoing method implementations for the content of the operation. Descriptions are not made herein in detail.

In an optional example, the operations S700 and S710 are performed by a processor by invoking a corresponding instruction stored in a memory, or are performed by an image sample input module 1020 run by the processor.

In S720, object detection processing is performed on the image sample via the student neural network according to the discrete feature data of the image sample formed by the student neural network.

In S730, supervised learning is performed on the student neural network by using a difference between the discrete feature data formed by the teacher neural network for the image sample and the discrete feature data formed by the student neural network for the image sample, and a difference between an object detection processing result output by the student neural network and detection box tagging information of the image sample as guidance information.

In an optional example, the object detection processing result output by the student neural network includes: position information of a detection box (for example, the coordinates of two vertices on diagonal lines of the detection box) and the class of the detection box. According to the present disclosure, for the purpose of reducing the difference between the discrete feature data formed by the teacher neural network for the image sample and the discrete feature data formed by the student neural network for the image sample, and reducing the difference between the object detection processing result output by the student neural network and the detection box tagging information of the image sample, supervised learning is performed on the student neural network by using corresponding loss functions (such as L2 loss function). The detection box tagging information of the image sample in the present disclosure includes: detection box position tagging information (for example, tagging of the coordinates of two vertices on diagonal lines of the detection box) and detection box classification tagging.

In an optional example, when the training of the student neural network meets a predetermined iteration condition, the training process is ended. The predetermined iteration condition in the present disclosure includes: the difference between the discrete feature data output by the student neural network and the discrete feature data output by the teacher neural network, and the difference between the object detection processing result output by the student neural network and the detection box tagging information of the image sample both satisfy a predetermined difference requirement. If the differences satisfy the predetermined difference requirement, the training of the student neural network succeeds. The predetermined iteration condition in the present disclosure also includes: the number of image samples used for training the student neural network satisfies a predetermined number requirement. If the number of image samples used satisfies the predetermined number requirement but the differences do not satisfy the predetermined difference requirement, the training of the student neural network does not succeed. The successfully trained student neural network is configured to form discrete feature data of the to-be-processed image and perform object detection processing.

In an optional example, the teacher neural network for knowledge transfer in the present disclosure mainly includes two parts, where one part is a successfully trained floating-point teacher neural network, which is usually configured to form floating-point feature data for an input image, and perform corresponding vision task processing on the input image according to the floating-point feature data (for example, classification processing or object detection processing); and the other part is a quantization auxiliary unit, which is configured to convert the floating-point feature data formed by the floating-point teacher neural network into discrete feature data, and provide the discrete feature data to the floating-point teacher neural network. The input of the quantization auxiliary unit is the output of the corresponding layer (such as the $N^{th}$ layer) in the floating-point teacher neural network, and the output of the quantization auxiliary unit is the input of the corresponding layer (such as the $(N+1)^{th}$ layer) in the floating-point teacher neural network. Hence, the quantization auxiliary unit in the present disclosure may be considered as a layer inserted in the floating-point teacher neural network. The process of training the teacher neural network is a fine adjustment process of the network parameters of the floating-point teacher neural network.

In an optional example, the operations S720 and S730 are performed by a processor by invoking a corresponding instruction stored in a memory, or are performed by a supervision module 1030 run by the processor.

Figure 8:
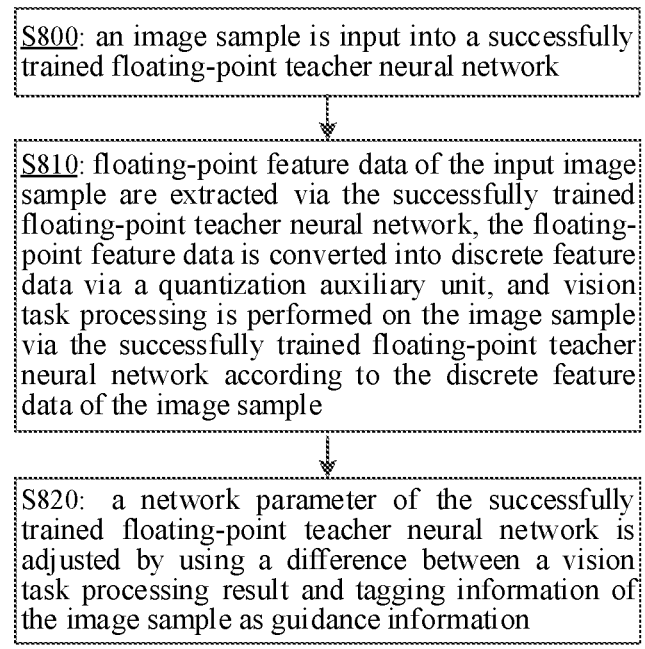
FIG. 8 is a flowchart of one embodiment of a teacher neural network training method according to the present disclosure.

A flowchart of one embodiment of a teacher neural network straining method according to the present disclosure is as shown in FIG. 8.

In FIG. 8, the training process includes: operation S800, operation S810, and operation S820. The following describes in detail the operations in FIG. 8.

Figure 9:
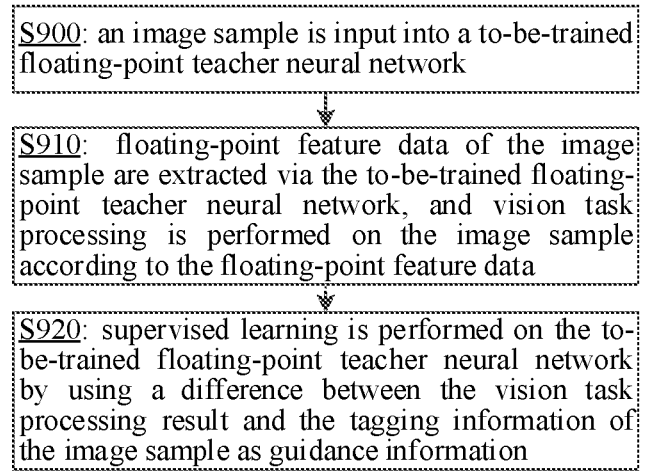
FIG. 9 is a flowchart of one embodiment of a floating-point teacher neural network training method according to the present disclosure.

In S800, an image sample is input into a successfully trained floating-point teacher neural network. The successfully trained floating-point teacher neural network is a neural network successfully trained in advance by using an image sample and configured to implement a corresponding vision task. One embodiment of a process of training the floating-point teacher neural network is as shown in FIG. 9.

In S810, floating-point feature data of the input image sample are extracted via the successfully trained floating-point teacher neural network, the floating-point feature data is converted into discrete feature data via a quantization auxiliary unit, and vision task processing is performed on the image sample via the successfully trained floating-point teacher neural network according to the discrete feature data of the image sample. For example, the successfully trained floating-point teacher neural network performs classification processing or object detection processing on the image sample according to the discrete feature data of the image sample.

In an optional example, the operations S800 and S810 are performed by a processor by invoking a corresponding instruction stored in a memory, or are performed by a first unit of a teacher training module 1040 run by the processor.

In S820, a network parameter of the successfully trained floating-point teacher neural network is adjusted by using a difference between a vision task processing result and tagging information of the image sample as guidance information (i.e., fine adjustment of network parameters).

In an optional example, the operation may also be considered to perform supervised learning on the successfully trained floating-point teacher neural network by using a difference between the vision task processing result and the tagging information of the image sample as guidance information. According to the present disclosure, for the purpose of reducing the difference between the vision task processing result output by the successfully trained floating-point teacher neural network according to discrete feature data and the tagging information of the image sample, fine adjustment is performed on the network parameters of the successfully trained floating-point teacher neural network by using corresponding loss functions (such as L2 loss function). The convergence condition of the fine adjustment of the network parameters usually includes: the difference between the vision task processing result output by the successfully trained floating-point teacher neural network according to the discrete feature data and the tagging information of the image sample satisfies a predetermined difference requirement.

In an optional example, the operation S820 is performed by a processor by invoking a corresponding instruction stored in a memory, or is performed by a first supervision unit of a teacher training module 1040 run by the processor.

In the present disclosure, fine adjustment is performed on the network parameters of the successfully trained floating-point teacher neural network, so that the vision task processing result output by the floating-point teacher neural network (i.e., a teacher neural network) according to the discrete feature data is more accurate, and thus, by means of knowledge transfer, the discrete feature data formed by the neural network in the present disclosure is more beneficial to accurate implementation of vision task processing.

A flowchart of one embodiment of a floating-point teacher neural network straining method according to the present disclosure is as shown in FIG. 9. In FIG. 9, the training process includes: operation S900, operation S910, and operation S920. The following describes in detail the operations in FIG. 9.

In S900, an image sample is input into a to-be-trained floating-point teacher neural network. The network parameters of the to-be-trained floating-point teacher neural network are usually floating-point network parameters, and the floating-point teacher neural network is usually a convolutional neural network, etc.

In S910, floating-point feature data of the image sample are extracted via the to-be-trained floating-point teacher neural network, and vision task processing is performed on the image sample according to the floating-point feature data. For example, the to-be-trained floating-point teacher neural network performs classification processing or object detection processing on the image sample according to the floating-point feature data.

In an optional example, the operations S900 and S910 are performed by a processor by invoking a corresponding instruction stored in a memory, or are performed by a second unit of a teacher training module 1040 run by the processor.

In S920, supervised learning is performed on the to-be-trained floating-point teacher neural network by using a difference between the vision task processing result and the tagging information of the image sample as guidance information.

In an optional example, the tagging information of the image sample is classification tagging information of the image sample or detection box tagging information of the image sample. According to the present disclosure, for the purpose of reducing the difference between the vision task processing result output by the to-be-trained floating-point teacher neural network according to the floating-point feature data and the tagging information of the image sample, supervised learning is performed on the to-be-trained floating-point teacher neural network by using corresponding loss functions (such as L2 loss function). The predetermined iteration condition of training usually includes: the difference between the vision task processing result output by the to-be-trained floating-point teacher neural network according to the floating-point feature data and the tagging information of the image sample satisfies a predetermined difference requirement.

In an optional example, the operation S920 is performed by a processor by invoking a corresponding instruction stored in a memory, or is performed by a second supervision unit of a teacher training module 1040 run by the processor.

Any method provided in the embodiments of the present disclosure is executed by any appropriate device having data processing capability, including, but not limited to, a terminal device and a server. Alternatively, any method provided in the embodiments of the present disclosure is executed by a processor, for example, any method mentioned in the embodiments of the present disclosure is executed by the processor by invoking a corresponding instruction stored in a memory. Details are not described below again.

A person of ordinary skill in the art may understand that all or some operations for implementing the foregoing method embodiments are achieved by a program by instructing related hardware; the foregoing program can be stored in a computer-readable storage medium; when the program is executed, operations including the foregoing method embodiments are executed. Moreover, the foregoing storage medium includes various media capable of storing a program code such as an ROM, an RAM, a magnetic disk, or an optical disk.

Figure 10:
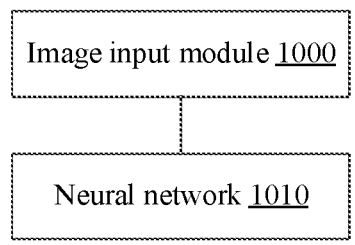
FIG. 10 is a schematic structural diagram of one embodiment of an image processing apparatus according to the present disclosure.

FIG. 10 is a schematic structural diagram of one embodiment of an image processing apparatus according to the present disclosure. The image processing apparatus shown in FIG. 10 includes: an image input module 1000 and a neural network 1010. Optionally, the apparatus further includes: an image sample input module 1020, a supervision module 1030, and a teacher training module 1040.

The image input module 1000 is configured to input a to-be-processed image into the neural network 1010.

The neural network 1010 is configured to form discrete feature data of the to-be-processed image.

The neural network in the present disclosure is trained based on guidance information, and during the training process, the neural network is taken as a student neural network, the guidance information used for training the neural network usually including: a difference between discrete feature data formed by a teacher neural network for an image sample and discrete feature data formed by the student neural network for the image sample.

In an optional example, the neural network in the present disclosure includes: a neural network whose size is no more than 2 MB.

In an optional example, the neural network in the present disclosure is further configured to: form floating-point feature data of the to-be-processed image, and quantize the floating-point feature data into discrete feature data of the to-be-processed image. For example, the neural network extracts floating-point feature data from the to-be-processed image, and converts the extracted floating-point feature data into floating-point feature data satisfying a predetermined requirement to floating-point feature data of the to-be-processed image.

In an optional example, the neural network converts the floating-point feature data into floating-point feature data with a predetermined number of channels. In another optional example, the neural network converts the floating-point feature data into floating-point feature data with a predetermined size.

In an optional example, the neural network furthers contines processing according to the discrete feature data of the to-be-processed image, for example, performing corresponding vision task processing on the to-be-processed image according to the discrete feature data of the to-be-processed image. In the case that the neural network further needs to continue to perform vision task processing, the guidance information for training the neural network further includes: a difference between a vision task processing result output by the student neural network for the image sample and tagging information of the image sample.

In an optional example, the vision task processing continued to be performed by the neural network is: classification processing or object detection processing. That is to say, the neural network classifies the to-be-processed image according to the discrete feature data of the to-be-processed image; or the neural network performs object detection processing on the to-be-processed image according to the discrete feature data of the to-be-processed image.

In the case that the neural network needs to perform classification processing on the to-be-processed image according to the discrete feature data of the to-be-processed image, the guidance information used for training the neural network further includes: a difference between a classification processing result output by the student neural network for the image sample and classification tagging information of the image sample.

In the case that the neural network needs to perform object detection processing on the to-be-processed image according to the discrete feature data of the to-be-processed image, the guidance information used for training the neural network further includes: a difference between an object detection processing result output by the student neural network for the image sample and detection box tagging information of the image sample.

Reference is made to the descriptions for FIGS. 1 to 4 in the foregoing method implementations for the operations performed by the image input module 1000 and the neural network 1010. Reference is made to the following descriptions for FIG. 11 for the operations performed by the image sample input module 1020, the supervision module 1030, and the teacher training module 1040. Descriptions are not made herein repeatedly.

Figure 11:
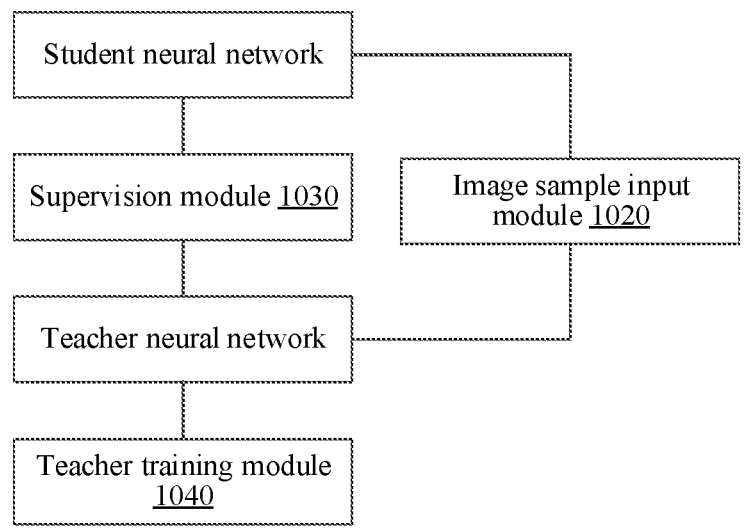
FIG. 11 is a schematic structural diagram of one embodiment of a neural network training apparatus according to the present disclosure.

FIG. 11 is a schematic structural diagram of one embodiment of a neural network straining apparatus according to the present disclosure. The training apparatus shown in FIG. 11 includes: an image sample input module 1020, a supervision module 1030, and a teacher training module 1040.

The image sample input module 1020 is configured to input an image sample into a student neural network and a teacher neural network respectively to form discrete feature data of the image sample via the student neural network and the teacher neural network respectively.

The supervision module 1030 is configured to perform supervised learning on the student neural network according to guidance information. The guidance information includes: a difference between discrete feature data formed by the teacher neural network for the image sample and discrete feature data formed by the student neural network for the image sample.

In an optional example, in the case that the student neural network is configured to perform vision task processing on the image sample according to the discrete feature data of the image sample, the supervision module 1030 is further configured to perform supervised learning on the student neural network by using, as guidance information, the difference between the discrete feature data formed by the teacher neural network for the image sample and the discrete feature data formed by the student neural network for the image sample and the difference between a vision task processing result output by the student neural network and tagging information of the image sample.

In an optional example, the teacher neural network in the present disclosure includes: a successfully trained floating-point teacher neural network and a quantization auxiliary unit. The successfully trained floating-point teacher neural network is configured to form floating-point feature data for an input image, and perform vision task processing on the input image. The quantization auxiliary unit is configured to convert the floating-point feature data formed by the teacher neural network into discrete feature data, and provide the discrete feature data to the floating-point teacher neural network, so that the floating-point teacher neural network performs vision task processing on the input image according to the discrete feature data.

In an optional example, the teacher training module 1040 in the present disclosure is configured to train a teacher neural network, and the teacher training module 1040 includes: a first unit and a first supervision unit. The first unit is configured to input an image sample into a successfully trained floating-point teacher neural network to extract floating-point feature data of the image sample via the successfully trained floating-point teacher neural network, convert the floating-point feature data into discrete feature data via a quantization auxiliary unit, and perform vision task processing on the image sample via the successfully trained floating-point teacher neural network according to the discrete feature data. The first supervision unit is configured to perform network parameter adjustment on the successfully trained floating-point teacher neural network by using a difference between a vision task processing result and tagging information of the image sample as guidance information.

In an optional example, the teacher training module 1040 further includes: a second unit and a second supervision unit. The second unit is configured to input an image sample into a to-be-trained floating-point teacher neural network to extract floating-point feature data of the image sample via the to-be-trained floating-point teacher neural network, and perform vision task processing on the image sample according to the floating-point feature data. The second supervision unit is configured to perform supervised learning on the to-be-trained floating-point teacher neural network by using a difference between a vision task processing result and tagging information of the image sample as guidance information.

Reference is made to the following descriptions for FIGS. 5 to 9 in the foregoing method implementations for the operations performed by the image sample input module 1020, the supervision module 1030, and the teacher training module 1040. Descriptions are not made herein repeatedly.

Figure 12:
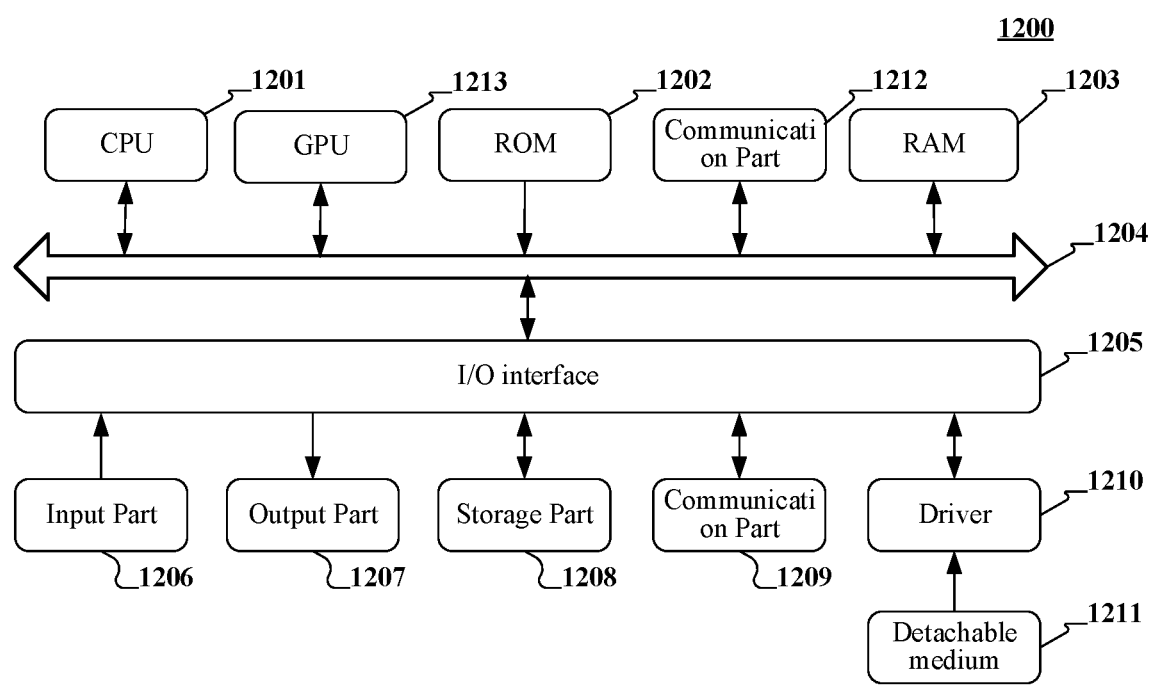
FIG. 12 is a block diagram of an exemplary device according to embodiments of the present disclosure.

FIG. 12 illustrates an exemplary device 1200 suitable for implementing the present disclosure. The device 1200 is a control system/electronic system configured in an automobile, a mobile terminal (such as a smart mobile phone), a Personal Computer (PC, such as a desktop computer or a notebook computer), a tablet computer, or a server. In FIG. 12, the device 1200 includes one or more processors, a communication part, and the like. The one or more processors are, for example, one or more Central Processing Units (CPUs) 1201 and/or one or more Graphic Processing Units (GPUs) 1213 performing image processing by using one or more neural networks, and the processors may execute various appropriate actions and processing according to executable instructions stored in a Read-Only Memory (ROM) 1202 or executable instructions loaded from a storage section 1208 to a Random Access Memory (RAM) 1203. The communication part 1212 may include, but is not limited to, a network card. The network card may include, but is not limited to, an Infiniband (IB) network card. The processor may communicate with the ROM 1202 and/or the RAM 1203, to execute executable instructions. The processor is connected to the communication part 1212 via a bus 1204, and communicates with other target devices via the communication part 1212, thereby implementing corresponding operations in the present disclosure.

Reference is made to related descriptions in the foregoing method embodiments for the operations executed by the instructions. Descriptions are not made herein in detail. In addition, the RAM 1203 may further store various programs and data required for operations of an apparatus. The CPU 1201, the ROM 1202, and the RAM 1203 are connected to each other via the bus 1204.

In the case that the RAM 1203 exists, the ROM 1202 is an optional module. The RAM 1203 stores executable instructions, or writes the executable instructions into the ROM 1202 during running, where the executable instructions cause the CPU 1201 to execute operations included in the foregoing segmentation method. An I/O interface 1205 is also connected to the bus 1204. The communication part 1212 is integrated, or is configured to have multiple sub-modules (for example, multiple IB network cards) connected to the bus respectively.

The following components are connected to the I/O interface 1205: an input part 1206 including a keyboard, a mouse and the like; an output part 1207 including a Cathode-Ray Tube (CRT), a Liquid Crystal Display (LCD), a speaker and the like; the storage part 1208 including a hard disk and the like; and a communication part 1209 of a network interface card including an LAN card, a modem and the like. The communication part 1209 performs communication processing via a network such as the Internet. A driver 1210 is also connected to the I/O interface 1205 according to requirements. A detachable medium 1211 such as a magnetic disk, an optical disk, a magneto-optical disk, a semiconductor memory or the like is mounted on the driver 1210 according to requirements, so that a computer program read from the removable medium is installed on the storage part 1208 according to requirements.

It should be particularly noted that, the architecture illustrated in FIG. 12 is merely an optional implementation mode. During specific practice, the number and types of the components in FIG. 12 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of the present disclosure.

Particularly, a process described below with reference to a flowchart according to implementations of the present disclosure may be implemented as a computer software program. For example, the implementations of present disclosure include a computer program product. The computer program product includes a computer program tangibly included in a machine-readable medium. The computer program includes a program code for performing operations shown in the flowchart. The program code may include instructions for correspondingly performing operations of the method provided in the present disclosure.

In such implementations, the computer program is downloaded and installed from the network through the communication section 1209, and/or is installed from the detachable medium 1211. When the computer program is executed by the CPU 1201, the instructions implementing the corresponding operations recited in the present disclosure are executed.

In one or more optional implementations, the embodiments of the present disclosure further provide a computer program product configured to store computer-readable instructions, where when the instructions are executed, a computer executes the method image processing method or the neural network training method in any of the foregoing embodiments.

The computer program product is implemented by means of hardware, software, or a combination thereof. In an optional example, the computer program product is represented by a computer storage medium. In another example, the computer program product is represented by a software product, such as Software Development Kit (SDK).

In one or more optional implementations, the embodiments of the present disclosure further provide another image processing method and neural network training method, corresponding apparatuses, an electronic device, a computer storage medium, a computer program, and a computer program product. The method includes: a first apparatus sends an image processing instruction or a neural network training instruction to a second apparatus, the instruction causing the second apparatus to execute the image processing method or the neural network training method in any one of the foregoing possible embodiments; and the first apparatus receives an image processing result or a neural network training result sent by the second apparatus.

In some embodiments, the image processing instruction or the neural network training instruction is an invocation instruction. The first apparatus instructs, by means of invocation, the second apparatus to perform image processing operations or neural network training operations; accordingly, in response to reception of the invocation instruction, the second apparatus performs operations and/or procedures in any embodiment of the foregoing image processing or network training method.

Based on the image processing methods, image processing apparatuses, neural network training methods, neural network training apparatuses, electronic devices, computer-readable storage media, and computer programs provided in the present disclosure, using, during the process of training a neural network, a to-be-trained neural network as a student neural network, and making guidance information to include discrete feature data formed by a teacher neural network and discrete feature data formed by the student neural network, will help improvement in the matching probability of the discrete feature data separately formed by the teacher neural network and the student neural network is facilitated, thereby facilitating transfer of the knowledge of the teacher neural network to the student neural network. The present disclosure does not limit that the network parameters of the student neural network must be fixed-point network parameters, and therefore, the neural network in the present disclosure may not be limited by a specific instruction set and a specific device. Hence, the technical solutions provided in the present disclosure facilitate improvement in the result output by a neural network while scaling back the neural network and increasing the running speed of the neural network, i.e., facilitating improvement in the performance of the neural network. In addition, the technical solutions provided in the present disclosure also facilitate improvement in the scope of application of the neural network.

It should be understood that the terms such as "first" and "second" in the embodiments of the present disclosure are only used for distinguishing, and shall not be understood as limitations on the embodiments of the present disclosure. It should also be understood that, in the present disclosure, "multiple" may refer to two or more, and "at least one" may refer to one, two or more It should also be understood that, for any component, data or structure mentioned in the present disclosure, if there is no explicit limitation or no opposite motivation is provided in context, it is generally understood that the number of the component, data or structure is one or more. It should also be understood that, the descriptions of the embodiments in the present disclosure focus on differences between the embodiments, and for same or similar parts in the embodiments, refer to these embodiments. For the purpose of brevity, details are not described again.

The methods, apparatuses, electronic devices, and computer-readable storage media according to the present disclosure may be implemented in many manners. For example, the methods, apparatuses, electronic devices and computer-readable storage media according to the present disclosure may be implemented by using software, hardware, firmware, or any combination of software, hardware, and firmware. The foregoing sequence of the operations of the method is merely for description, and unless otherwise stated particularly, the operations of the method in the present disclosure are not limited to the described sequence. In addition, in some implementations, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The implementations are selected and described to better describe a principle and an actual application of the present disclosure, and to make a person of ordinary skill in the art understand the embodiments of the present disclosure, so as to design various implementations with various modifications applicable to particular use.

The invention claimed is:

1. An image processing method, comprising:
inputting a to-be-processed image into a neural network; and
forming discrete feature data of the to-be-processed image via the neural network, the discrete feature data being a discrete feature map,
wherein the neural network is trained based on guidance information, and during the training process, the neural network is taken as a student neural network; and the guidance information comprises: a difference between discrete feature data formed by a teacher neural network for an image sample and discrete feature data formed by the student neural network for the image sample,
wherein the neural network is trained by:
inputting an image sample into a student neural network and a teacher neural network, respectively;

forming discrete feature data of the image sample via the student neural network and the teacher neural network, respectively; and performing supervised learning on the student neural network according to the guidance information.

2. The method according to claim 1, wherein the forming discrete feature data of the to-be-processed image via the neural network comprises:

forming floating-point feature data of the to-be-processed image via the neural network, and quantizing the floating-point feature data into the discrete feature data of the to-be-processed image.

3. The method according to claim 2, wherein the forming floating-point feature data of the to-be-processed image via the neural network comprises:

extracting floating-point feature data from the to-be-processed image via the neural network, and converting the extracted floating-point feature data into floating-point feature data satisfying a predetermined requirement to form the floating-point feature data of the to-be-processed image.

4. The method according to claim 3, wherein the converting the extracted floating-point feature data into floating-point feature data satisfying a predetermined requirement comprises at least one of:

converting the floating-point feature data into floating-point feature data with a predetermined number of channels; or converting the floating-point feature data into floating-point feature data with a predetermined size.

5. The method according to claim 1, further comprising:
performing corresponding vision task processing on the to-be-processed image via the neural network according to the discrete feature data of the to-be-processed image, wherein the guidance information further comprises: a difference between a vision task processing result output by the student neural network for the image sample and tagging information of the image sample.

6. The method according to claim 5, wherein the performing corresponding vision task processing on the to-be-processed image via the neural network according to the discrete feature data of the to-be-processed image comprises:

performing classification processing on the to-be-processed image via the neural network according to the discrete feature data of the to-be-processed image; or performing object detection processing on the to-be-processed image according to the discrete feature data of the to-be-processed image, wherein the guidance information further comprises:

a difference between a classification processing result output by the student neural network for the image sample and classification tagging information of the image sample; or a difference between an object detection processing result output by the student neural network for the image sample and detection box tagging information of the image sample.

7. The method according to claim 1, wherein the training process of using the neural network as a student neural network further comprises:

performing vision task processing on the image sample via the student neural network according to the discrete feature data of the image sample;

the performing supervised learning on the student neural network according to guidance information comprises:

performing supervised learning on the student neural network by using, as guidance information, the difference between the discrete feature data formed by the teacher neural network for the image sample and the discrete feature data formed by the student neural network for the image sample and a difference between a vision task processing result output by the student neural network and tagging information of the image sample.

8. The method according to claim 1, wherein the teacher neural network comprises:

a successfully trained floating-point teacher neural network configured to form floating-point feature data for an input image, and perform vision task processing on the input image according to the floating-point feature data; and a quantization auxiliary unit configured to convert the floating-point feature data formed by the floating-point teacher neural network into discrete feature data, and provide the discrete feature data to the floating-point teacher neural network, so that the floating-point teacher neural network performs vision task processing on the input image according to the discrete feature data.

9. The method according to claim 8, wherein a process of training the teacher neural network comprises:

inputting an image sample into a successfully trained floating-point teacher neural network;

extracting floating-point feature data of the image sample via the successfully trained floating-point teacher neural network, converting the floating-point feature data into discrete feature data via the quantization auxiliary unit, and performing vision task processing on the image sample via the successfully trained floating-point teacher neural network according to the discrete feature data; and performing network parameter adjustment on the successfully trained floating-point teacher neural network by using a difference between the vision task processing result and tagging information of the image sample as guidance information.

10. The method according to claim 8, wherein a process of training the floating-point teacher neural network comprises:

inputting an image sample into a to-be-trained floating-point teacher neural network;

extracting floating-point feature data of the image sample via the to-be-trained floating-point teacher neural network, and performing vision task processing on the image sample according to the floating-point feature data; and performing supervised learning on the to-be-trained floating-point teacher neural network by using a difference between the vision task processing result and tagging information of the image sample as guidance information.

11. A non-transitory computer-readable storage medium having stored thereon computer-readable instructions that, when executed by a processor, cause the processor to implement the method according to claim 1.

12. A mobile terminal implementing the method according to claim 1, wherein:

the student neural network is trained by using the teacher neural network forming discrete feature data, such that the knowledge of the teacher neural network can be transferred to the student neural network, and the network parameters of the student neural network are not limited to fixed-point network parameters;

the student neural network is configured to perform floating-point arithmetic, such that after the student neural network is successfully trained, the neural network is not be limited by a specific instruction set and a specific device, thereby facilitating improvement in an application range of the neural network; and the floating feature data obtained by the floating-point arithmetic are converted into discrete feature data by quantization and maintain high accuracy, thereby facilitating matching between the discrete feature data output by the teacher neural network and the discrete feature data output by the student neural network and transfer of the knowledge of the teacher neural network to the student neural network.

13. An image processing apparatus, comprising:
a memory storing processor-executable instructions; and
a processor arranged to execute the stored processor-executable instructions to perform steps of:
inputting a to-be-processed image into a neural network; and
forming discrete feature data of the to-be-processed image, the discrete feature data being a discrete feature map,
wherein the neural network is trained based on guidance information, and during the training process, the neural network is taken as a student neural network; and the guidance information comprises: a difference between discrete feature data formed by a teacher neural network for an image sample and discrete feature data formed by the student neural network for the image sample,
wherein the neural network is trained by:
inputting an image sample into a student neural network and a teacher neural network, respectively;
forming discrete feature data of the image sample via the student neural network and the teacher neural network, respectively; and
performing supervised learning on the student neural network according to the guidance information.

14. The apparatus according to claim 13, wherein the forming discrete feature data of the to-be-processed image via the neural network comprises:
forming floating-point feature data of the to-be-processed image via the neural network, and quantizing the floating-point feature data into discrete feature data of the to-be-processed image.

15. The apparatus according to claim 14, wherein the forming floating-point feature data of the to-be-processed image via the neural network comprises:
extracting floating-point feature data from the to-be-processed image via the neural network, and converting the extracted floating-point feature data into floating-point feature data satisfying a predetermined requirement to form floating-point feature data of the to-be-processed image.

16. The apparatus according to claim 15, wherein the converting the extracted floating-point feature data into floating-point feature data satisfying a predetermined requirement comprises at least one of:
converting the floating-point feature data into floating-point feature data with a predetermined number of channels; or
converting the floating-point feature data into floating-point feature data with a predetermined size.

17. The apparatus according to claim 13, wherein the processor is arranged to execute the stored processor-executable instructions to further perform a step of:
performing corresponding vision task processing on the to-be-processed image according to the discrete feature data of the to-be-processed image,
wherein the guidance information further comprises: a difference between the vision task processing result output by the student neural network for the image sample and tagging information of the image sample.

18. The apparatus according to claim 17, wherein the performing corresponding vision task processing on the to-be-processed image via the neural network according to the discrete feature data of the to-be-processed image comprises:
performing classification processing on the to-be-processed image according to the discrete feature data of the to-be-processed image; or
performing object detection processing on the to-be-processed image according to the discrete feature data of the to-be-processed image,
wherein the guidance information further comprises:
a difference between a classification processing result output by the student neural network for the image sample and classification tagging information of the image sample; or
a difference between an object detection processing result output by the student neural network for the image sample and detection box tagging information of the image sample.

* * * * *